(12) United States Patent
Pedersen et al.

(10) Patent No.: US 8,954,009 B2
(45) Date of Patent: Feb. 10, 2015

(54) AUTONOMOUS FEMTO NODE CARRIER FREQUENCY SELECTION

(75) Inventors: Klaus I. Pedersen, Aalborg (DK); Troels E. Kolding, Klarup (DK); Chun Hai Yao, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 53 days.

(21) Appl. No.: 12/723,980

(22) Filed: Mar. 15, 2010

(65) Prior Publication Data

US 2011/0222484 A1 Sep. 15, 2011

(51) Int. Cl.
| | |
|---|---|
| H04B 15/00 | (2006.01) |
| H04W 4/00 | (2009.01) |
| H04W 36/00 | (2009.01) |
| H04W 40/00 | (2009.01) |
| H04L 5/00 | (2006.01) |
| H04W 72/02 | (2009.01) |
| H04W 28/04 | (2009.01) |
| H04W 28/18 | (2009.01) |
| H04W 84/04 | (2009.01) |

(52) U.S. Cl.
CPC ............... *H04L 5/006* (2013.01); *H04L 5/001* (2013.01); *H04W 72/02* (2013.01); *H04W 28/04* (2013.01); *H04W 28/18* (2013.01); *H04W 84/045* (2013.01)
USPC ......... 455/62; 455/63.2; 455/422.1; 455/443; 455/444; 455/449

(58) Field of Classification Search
USPC .................. 455/62, 266, 452.2; 370/437, 468
See application file for complete search history.

(56) References Cited

U.S. PATENT DOCUMENTS

| | | | |
|---|---|---|---|
| 2003/0125039 A1* | 7/2003 | Lachtar et al. | 455/453 |
| 2009/0285113 A1* | 11/2009 | Yavuz et al. | 370/252 |
| 2011/0212739 A1 | 9/2011 | Pedersen et al. | 455/501 |

OTHER PUBLICATIONS

Garcia, L.G.U.; Pedersen, K.I.; Mogensen, P.E.; , "Autonomous component carrier selection: interference management in local area environments for LTE-advanced," Communications Magazine, IEEE , vol. 47, No. 9, pp. 110-116, Sep. 2009 doi: 10.1109/MCOM.2009. 5277463 URL: http://ieeexplore.ieee.org/stamp/stamp.jsp?tp=&arnumber=5277463&isnumber=5277441.*
3GPP TSG RAN WG1 #54 Meeting "Autonomous component carrier selection for LTE-Advanced," Aug. 18-22, 2008.*

(Continued)

*Primary Examiner* — Temesgh Ghebretinsae
*Assistant Examiner* — Devan Sandiford
(74) *Attorney, Agent, or Firm* — Harrington & Smith

(57) ABSTRACT

For each $n^{th}$ carrier frequency bandwidth of a set of N carrier frequency bandwidths there is determined interference (in which n is an index and N is an integer greater than one). For each $n^{th}$ carrier frequency bandwidth, there is determined a number of cells operating on the $n^{th}$ carrier frequency bandwidth. The number of carrier frequency bandwidths available for selection is reduced to less than N by excluding from consideration at least one carrier frequency bandwidth based on the determined number of cells operating thereon. From the reduced number is selected a carrier frequency bandwidth for use by a host femto cell. In various specific embodiments: the carrier frequency bandwidth excluded from consideration has a maximum number of cells operating thereon; and/or closed subscriber group cells having path loss exceeding a threshold are excluded from the per carrier count; and/or only femto cells are included in the per carrier count.

14 Claims, 5 Drawing Sheets

(56) References Cited

OTHER PUBLICATIONS

3GPP TSG-RAN WG1 #55 "Support of wider bandwidth for Home eNodeB in LTE-Advanced," Nov. 10-14, 2008.*
3GPP TSG RAN WG1 #55 Meeting "Algorithms and results for autonomous component carrier selection for LTE-Advanced," Nov. 10-14, 2008.*
3GPP TSG RAN WG1 Meeting #60 "Downlink Interference Coordination Between eNodeB and Home eNodeB," Feb. 22-26, 2010.*
Kovacs I. et al., "Carrier Aggregation in LTE-Advanced (from physical layer to upper layers)," Workshop Session 10c: "Technologies for LTE-Advanced: from Theory to Practice" presentation, Jun. 17, 2011.*
3GPP TSG Ran WG! #56 Meeting, "Use of Background Interference Matrix for Autonomous Component Carrier Selection for LTE-Advanced," Feb. 9-13, 2009.*
3GPP TSG RAN WG1 #57 Meeting, R1-091779; "Primary Component Carrier Selection, Monitoring, and Recovery"; San Francisco, USA, May 2009, XP050339300, 7 pages.
"Autononous component carrier selection for LTE-Advanced", Nokia Siemens Networks, 3GPP TSG RAN WG1 #54 Meeting, R1-083103, Aug. 2008, 4 pgs.
"Algorithms and results for autonomous component carrier selection for LTE-Advanced", Nokia Siemens Netowrks, 3GPP TSG RAN WG1 #55 Meeting, R1-084321, Nov. 2008, 5 pgs.
"Support of wider bandwidth for Home eNodeB in LTE-Advanced", Alcatel Shanghai Bell, 3GPP TSG-RAN WG1 #55, R1-084125, Nov. 2008, 5 pgs.
"Use of Background Interference Matrix for Autonomous Component Carrier Selection for LTE-Advanced", Nokia Siemens Networks, 3GPP TSG RAN WG1 #56 Meeting, R1-090735, Feb. 2009, 7 pgs.
"Downlink Interference Coordination Between eNodeB and Home eNodeB", NTT Docomo, 3GPP TSG RAN WG1 Meeting #60, R1-101225, Feb. 2010, 8 pgs.
"Autonomous Component Carrier Selection: Interference Management in Local Area Environments for LTE-Advanced", Luis G. U. Garcia et al., IEEE Communications Magazine, Sep. 2009, pp. 110-116.
"Carrier Aggregation in LTE-Advanced (from physical layer to upper layers)", Istvan Z. Kovacs et al., Samurai, Jun. 2011, 39 pgs.

* cited by examiner

Figure 1: Prior Art

AUTONOMOUS FEMTO NODE CARRIER FREQUENCY SELECTION

TECHNICAL FIELD

The exemplary and non-limiting embodiments of this invention relate generally to wireless communication systems, methods, devices and computer programs and, more specifically, relate to carrier selection in a multi-carrier or carrier aggregation system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACCS autonomous component carrier selection
BIM background interference matrix
CA carrier aggregation
CC component carrier
CSG closed subscriber group
DL downlink (eNB to UE)
eNB E-UTRAN Node B (base station of an LTE system)
E-UTRAN evolved UTRAN (also known as LTE)
HeNB LTE femto node
HNB WCDMA femto node
IMT international mobile telecommunications
ITU-R international telecommunication union-radio
LTE long term evolution
LTE-A LTE advanced
SINR signal to interference plus noise ratio
UE user equipment
UL uplink (UE to eNB)
UTRAN universal terrestrial radio access network
WCDMA wideband code division multiple access In the communication system known as evolved UTRAN (E-UTRAN, also referred to as UTRAN-LTE, E-UTRA), the LTE Release 8 is completed, the LTE Release 9 is being standardized, and the LTE Release 10 is currently under development within the 3GPP. In LTE the downlink access technique is orthogonal frequency division multiple access OFDMA, and the uplink access technique is single carrier frequency division multiple access SC-FDMA. These access techniques are expected to continue in LTE Release 10.

Of particular interest herein are the further releases of 3GPP LTE targeted towards future IMT-Advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10. LTE-A is expected to use a mix of local area and wide area optimization techniques to fulfill the ITU-R requirements for IMT-Advanced while keeping the backward compatibility with LTE Release 8.

There is a bandwidth extension beyond 20 MHz in LTE-Advanced which is to be done via carrier aggregation (CA). This is shown conceptually at FIG. 1 in which there are five CCs or carrier frequency bandwidths of 20 MHz each that are aggregated to form one larger LTE-Advanced bandwidth of 100 MHz. Each carrier frequency bandwidth has DL and UL resources for enabling increased data rates such as for example by simultaneously scheduling an active UE across multiple carrier frequency bandwidths to better distribute traffic. Other embodiments of CA may have non-contiguous carrier frequency bandwidths and/or an asymmetric DL/UL CA which for example may be built by combining a frequency division duplex FDD carrier with a time division duplex TDD carrier. LTE-A is not the only CA-type system.

Another aspect being developed in LTE-A is the concept of heterogeneous networking, or HetNet for short. Adjacent cells cooperate to achieve more efficient use of scarce radio resources even if they are different wireless systems. For example, there may be femto-cells, sometimes termed home base stations (HeNB in LTE; HNB in WCDMA) or other networks of one cell or very limited geographic area, existing side by side with other femto-cells and with traditional network-operated cellular base stations/eNBs. These cells may cooperate to mitigate interference with one another, or at least positively limit their own interference to adjacent cells to avoid the greedy cell scenario in which one cell occupies more bandwidth resources than its traffic justifies, at the expense of an adjacent cell.

ACCS is one of the interference management schemes that is proposed for LTE-A. In ACCS the network access node makes its own selection as to which CC it will take into use at a given time, with consideration to not interfering too much with adjacent cells. Reference is made to co-owned US provisional patent application no. 61/309,044, filed on Mar. 1, 2010 and entitled "Enhanced Estimation of Uplink Interference Coupling", which details a technique by which femto nodes determine interference coupling with adjacent cells for use in selecting which CC to take into use.

Typically the femto node will be given a set of candidate carrier frequency bandwidths (also termed component carriers CCs) from which to choose. Denote these frequency bandwidths as $\{f_1, f_2, \ldots, f_n\}$, where N is the number of carriers in the whole CA system (typically for WCDMA each carrier frequency bandwidth is 5 MHz and in LTE the carrier frequency bandwidths currently range from 1.4 MHz to 20 MHz). The given set may be all N CCs in the CA or it may be a subset of them. Upon powering on a femto node, it will have to autonomously select which carrier frequency bandwidth of its given set to use. To maximize the femto cell performance it has been recommended that the femto node measure the total received interference on each carrier, and then select the carrier frequency bandwidth with the lowest interference level.

This simple approach of selecting the carrier with the lowest interference might appear optimal from the individual node's perspective but can lead to problems when multiple femto nodes employ that same technique. Specifically, problems are likely to occur if many closed subscriber group CSG femto cells in a dense local area are using all of the possible carrier frequency bandwidths which are also available for macro cell users. In these instances a macro cell user, that is not part of any femto cell's CSG, will experience significant interference from the femto nodes. It is quite possible that the interference can be severe enough and the resulting SINR so poor that the macro cell cannot find for its own use a carrier frequency bandwidth that is sufficiently free of co-channel interference with femto cells, leading to what is termed a "macro cell coverage hole".

Prior to this invention, the solution to this problem of which the inventors are aware was to restrict the set of candidate carrier frequency bandwidths given to the femto cells to ensure that one carrier for the macro operator is always free of CSG H(e)NB. One may make the offered frequency range different depending on whether the H(e)NB is of type closed (CSG), open (non-CSG) or hybrid. But for femto operators that only have (for example) two or three carriers available this approach to ensure full coverage on the macro layer is a severe limitation to radio performance on the femto layer. The above approach of reserving an "escape carrier" for macro use is quite expensive respecting scarce over the air radio resources, and unnecessary in many areas of the network. These teachings provide a more elegant solution that is not so restrictive to the femto layer.

SUMMARY

In a first aspect the exemplary embodiments of the invention provide a method comprising: determining interference for each $n^{th}$ carrier frequency bandwidth of a set of N carrier frequency bandwidths, in which n is an index and N is an integer greater than one; for each $n^{th}$ carrier frequency bandwidth, determining a number of cells operating on the $n^{th}$ carrier frequency bandwidth; reducing the number of carrier frequency bandwidths available for selection to less than N by excluding from consideration at least one carrier frequency bandwidth based on the determined number of cells operating thereon; and selecting from the reduced number a carrier frequency bandwidth for use by a host femto cell.

In a second aspect the exemplary embodiments of the invention provide a memory storing computer readable instructions that when executed by at least one processor cause the at least one processor to perform actions. In this aspect the actions comprise: determining interference for each $n^{th}$ carrier frequency bandwidth of a set of N carrier frequency bandwidths, in which n is an index and N is an integer greater than one; for each $n^{th}$ carrier frequency bandwidth, determining a number of cells operating on the $n^{th}$ carrier frequency bandwidth; reducing the number of carrier frequency bandwidths available for selection to less than N by excluding from consideration at least one carrier frequency bandwidth based on the determined number of cells operating thereon; and selecting from the reduced number a carrier frequency bandwidth for use by a host femto cell.

In a third aspect the exemplary embodiments of the invention provide an apparatus comprising at least one processor and at least one memory storing computer program code. The at least one processor is configured with the at least one memory and computer program code to cause the apparatus to perform at least: determining interference for each $n^{th}$ carrier frequency bandwidth of a set of N carrier frequency bandwidths, in which n is an index and N is an integer greater than one; for each $n^{th}$ carrier frequency bandwidth, determining a number of cells operating on the $n^{th}$ carrier frequency bandwidth; reducing the number of carrier frequency bandwidths available for selection to less than N by excluding from consideration at least one carrier frequency bandwidth based on the determined number of cells operating thereon; and selecting from the reduced number a carrier frequency bandwidth for use by a host femto cell.

DETAILED DESCRIPTION

In accordance with an exemplary embodiment of the invention and unlike the inventors' understanding of the prior art approaches for femto cell ACCS, the CSG femto cells can be allowed a full range of the available carrier frequency bandwidths. This enables an improved performance per femto cell due to a better diversity. In an exemplary embodiment of the invention, to solve the macro coverage issue in dense femto cell deployments, the autonomous carrier frequency bandwidth selection which is done by each femto cell in an area ensures that there is at least one carrier frequency bandwidth which is explicitly not selected by the femto cells, and thereby left available for use by the macro cells (though not necessarily free of femto cells as in the approach noted in the background section above).

While the specific and non-limiting examples below are detailed in the context of an LTE or LTE-A femto cell (HeNB) being the node which performs the autonomous carrier selection process, these teachings are readily applicable for HNBs of a WCDMA system and for other femto cells of other wireless systems.

Figure 1:
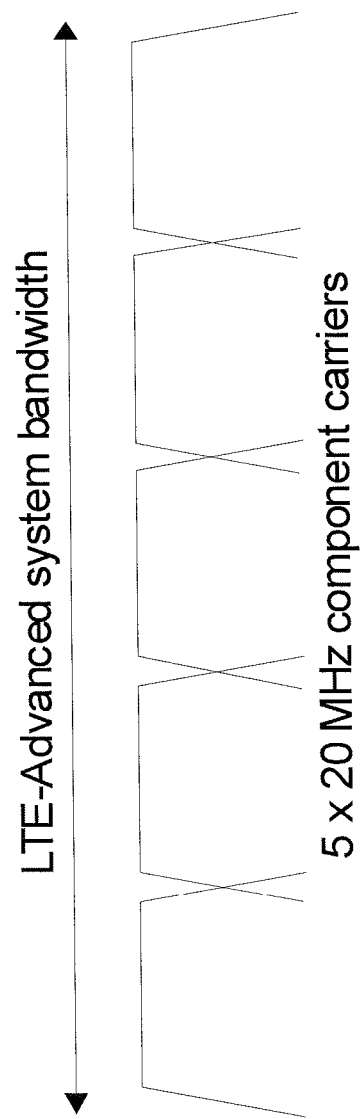
FIG. 1 is a schematic diagram of a conventional carrier aggregation of five component carriers into a single LTE-Advanced bandwidth, which represents an exemplary environment in which these teachings can be used to advantage.

A specific exemplary embodiment of the invention is described with reference to FIG. 2. There is a host femto cell HeNB 12 which autonomously selects one carrier frequency bandwidth from among a set of carrier frequency bandwidths which it is given. Assume for this example that there are five carrier frequency bandwidths in the CA of the LTE-A system as shown at FIG. 1, and the host femto cell HeNB 12 is given N=3 carrier frequency bandwidths in its set, namely $\{f_1, f_2, f_3\}$.

Figure 2:
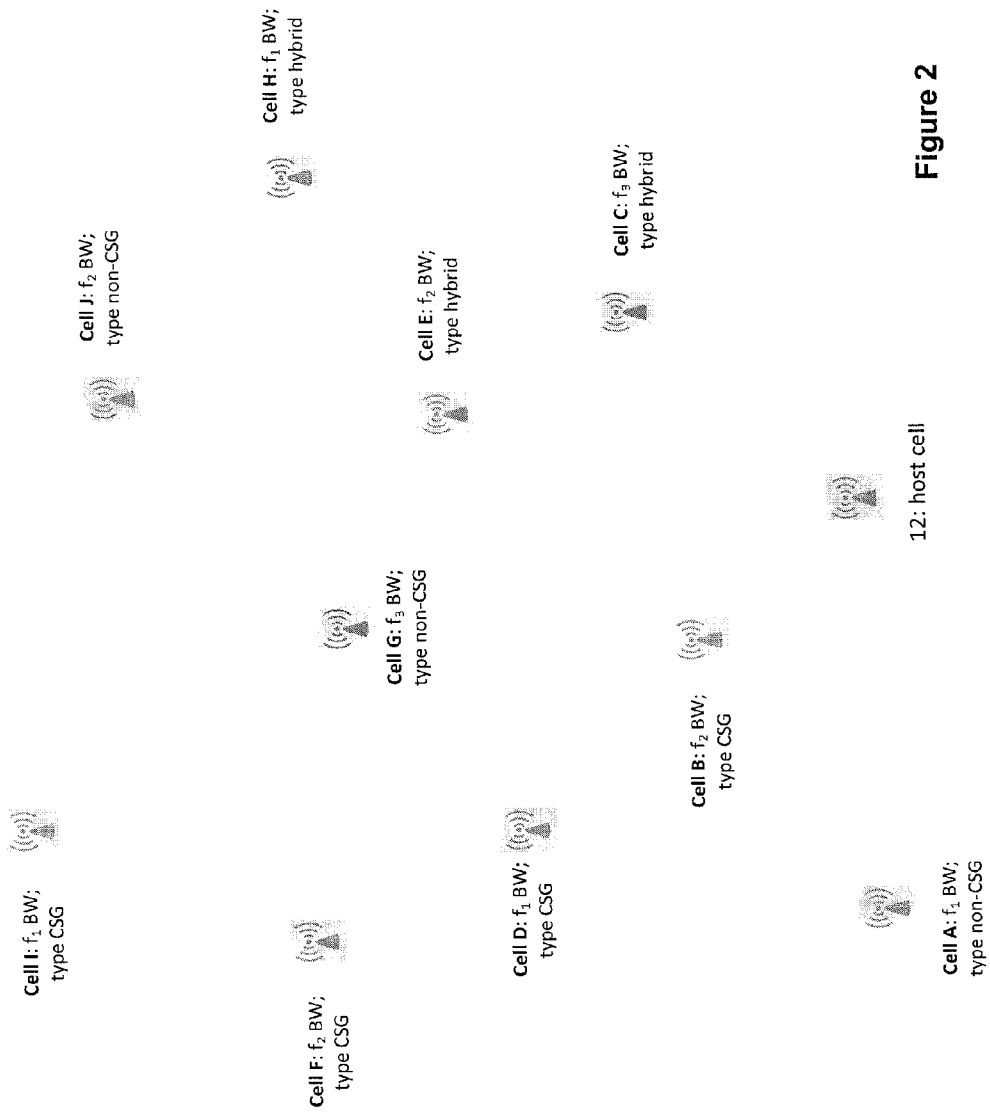
FIG. 2 is a schematic diagram of a host femto cell with ten other cells for which the host cell can detect and measure interference and path loss in order to select a carrier frequency bandwidth according to an exemplary embodiment of the invention.

Assume further at FIG. 2 that there are ten other cells, designated A through J, in the vicinity of the host cell HeNB 12 as shown. "In the vicinity" in this context means the host cell HeNB 12 can measure interference to and from those other cells, and in a specific embodiment the host cell 12 can also measure path loss as will be detailed below. FIG. 2 denotes each of those ten other cells as operating on one and only one of the three carrier frequency bandwidths of the host HeNB's set; in other implementations one of more of them may be operating on more than one of those same carrier frequency bands. Other neighbor cells operating only on a carrier that is not within the set $\{f_1, f_2, f_3\}$ given to the host cell 12 are not considered.

Figure 3:
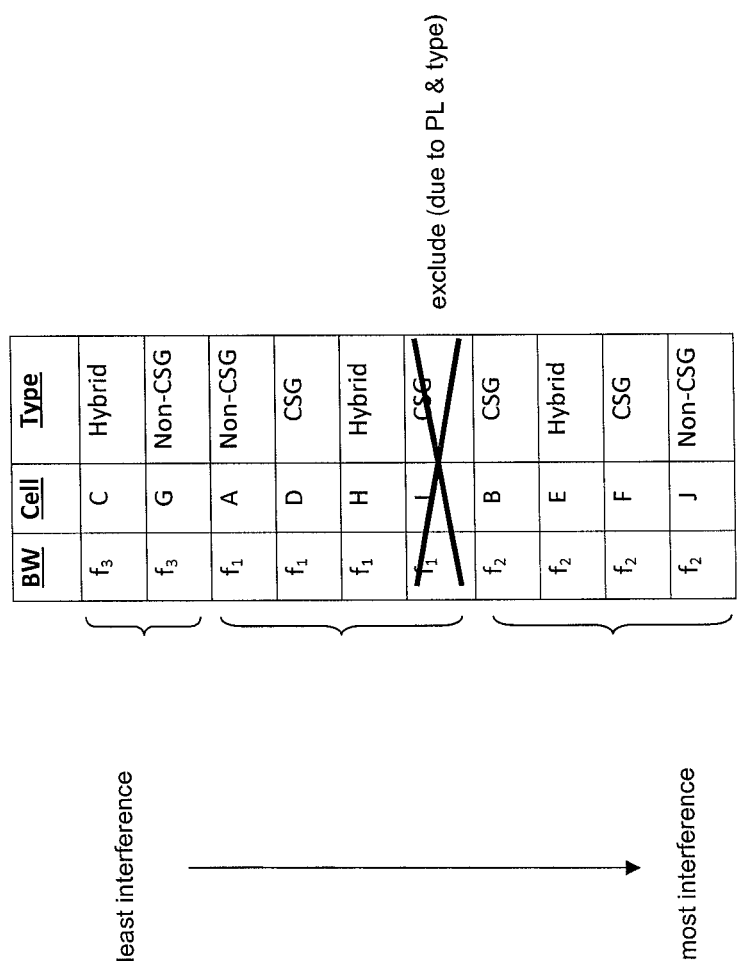
FIG. 3 is a table ranking the three different carrier frequency bandwidths of the ten cells at FIG. 2 in priority of interference level for use in selecting one carrier frequency bandwidth according to an exemplary embodiment of the invention.

The host HeNB 12 measures the received interference level on each of the three carrier frequency bandwidths in its designated set. Term these the candidate carrier frequency bandwidths since these are the only ones which the HeNB 12 is able to select from for actual use once the host HeNB 12 is powered up. The table of FIG. 3 shows the three carrier frequency bandwidths ordered according to the measured or determined interference: there is least interference on $f_3$, most interference on $f_2$, and the interference that the host cell 12 sees on $f_1$ is between that of the other two carrier frequency bandwidths. Stated more generally at block 402 of FIG. 4, the host HeNB 12 determines per carrier interference for each $n^{th}$ carrier frequency bandwidth of a set of N carrier frequency bandwidths, where n is an index (for example, running 1 through N) and N is an integer greater than one.

After determining the per carrier interference, the host HeNB 12 counts up the number of cells operating in each of the carrier frequency bandwidths. This is shown most concisely at FIG. 3 using the various cells of FIG. 2; there are two cells C and G operating on carrier frequency bandwidth $f_3$; there are four cells A, D, H and I operating on carrier frequency bandwidth $f_1$; and there are four cells B, J, F and J operating on carrier frequency bandwidth $f_2$. Stated more generally at block 404 of FIG. 4, for each $n^{th}$ carrier frequency bandwidth, the host HeNB 12 determines a number of cells operating on the $n^{th}$ carrier frequency bandwidth.

It is clear from FIG. 2 that some of those ten cells are far removed from the host cell 12. In an exemplary embodiment those cells which are furthest from the host cell are excluded from further consideration in the method for selecting a carrier frequency bandwidth. If the host HeNB 12 has actual geographic locations for those neighbor cells A through J then the host cell can use that location information. More typically the host cell will not, and so in an exemplary embodiment path loss is used instead as a proxy for distance; cells with the greatest path loss are deemed to be those furthest from the host cell 12. The host cell 12 measures path loss for each of those ten neighbor cells A though J and excludes those whose path loss exceeds some predetermined threshold as shown at optional block 410 of FIG. 4. In an exemplary embodiment this exclusionary threshold is applied only for cells of a certain predetermined type, such as closed subscriber group femto cells. This exemplary embodiment depends on the host HeNB 12 being able to determine the type of its neighbor cells, for example, determining whether a cell is CSG or non-CSG when the host HeNB 12 measures its neighbors.

Using the example from FIGS. 2-3, assume that three of the cells, cells H, I and J, exceed the path loss threshold. But since only cell I is a CSG cell only cell I is excluded from being included in the per carrier count. In this case, the count of cells per carrier frequency bandwidth is different than that noted above since cell I on $f_1$ is now excluded. Using the path loss exclusion embodiment, determining the number of cells per carrier frequency bandwidth results in two cells C and G operating on $f_3$; three cells A, D and H on $f_1$; and four cells B, E, F and J on $f_2$. Note that the embodiment in which the furthest cells/highest path loss cells are excluded does not require two different counts of cells per carrier frequency; they need only be counted once after the path loss analysis and cell exclusion step.

Figure 4:
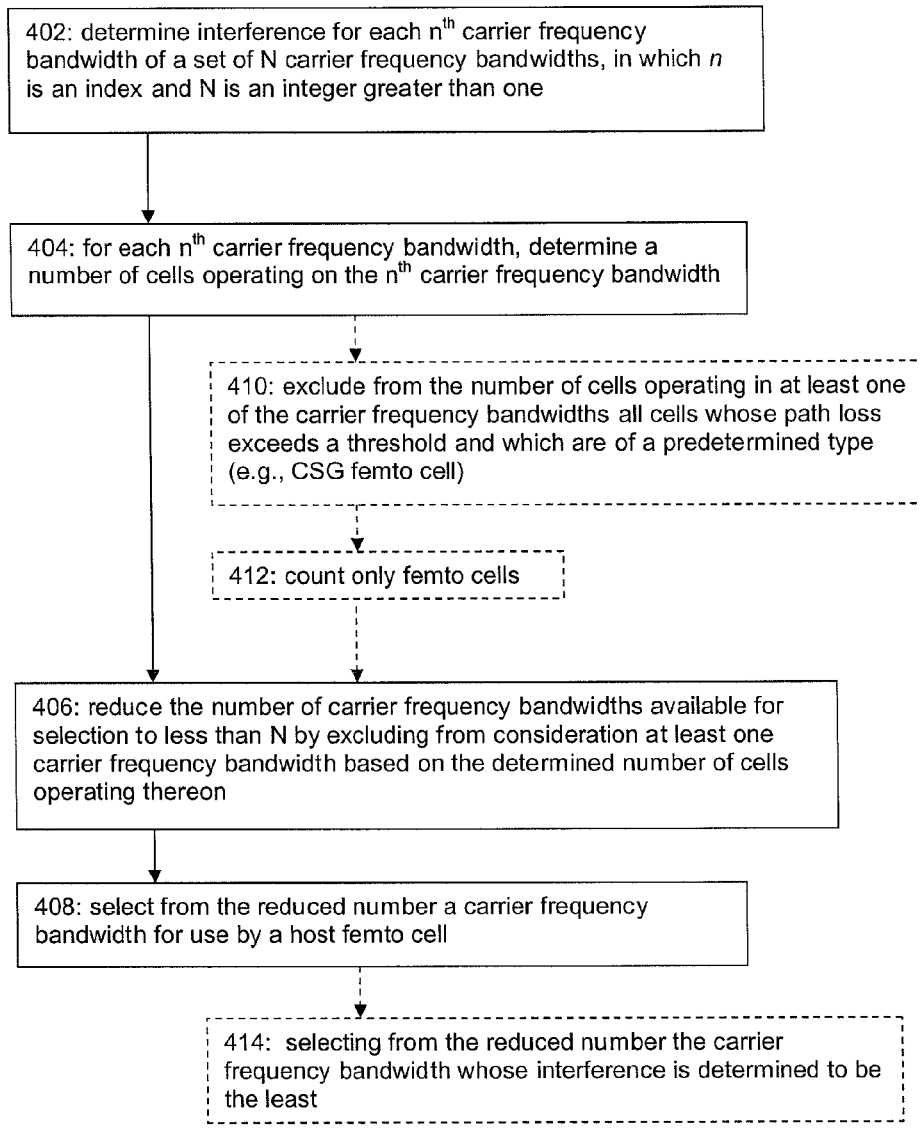
FIG. 4 is a logic flow diagram that illustrates the operation of a method, and a result of execution of computer program instructions embodied on a computer readable memory, in accordance with an exemplary embodiment of this invention.

In an exemplary embodiment shown at optional block 412 of FIG. 4, the host node considers only femto cells from the start, whether or not the path loss exclusion is also used; the host cell does not include macro cells (traditional cellular base stations) when counting cells per carrier frequency. In this case then, all of the ten neighbor cells shown at FIG. 2 are femto cells, and macro cells operating even on a carrier within the host cell's set $\{f_1, f_2, f_3\}$ are not included in the count.

At this point there is still three carrier frequency bandwidths $\{f_1, f_2, f_3\}$ from which the host cell may choose. This is the full set of N carrier frequency bandwidths given to the host cell originally, and at this point according to block 406 of FIG. 4 it is reduced to less than N carriers by excluding from consideration at least one carrier frequency bandwidth based on the determined number of cells operating thereon. In a specific example the one carrier bandwidth that is excluded is the carrier determined at block 404 of FIG. 4 to have a maximum number of cells operating thereon. Using the example of FIGS. 2-3, the highest number of cells per carrier frequency bandwidth is four cells, on $f_2$. In another exemplary embodiment the two carrier frequency bandwidths with the highest and next-highest number of cells determined at block 404 of FIG. 4 are excluded at block 406 of FIG. 4 from further consideration in selecting a carrier, which in the FIG. 2-3 example the excluded carrier frequency bandwidths would be $f_1$ and $f_2$.

Assuming the first example immediately above in which only $f_2$ is excluded from further consideration, this leaves in the example two carrier frequency bandwidths $\{f_1, f_3\}$ from which the host HeNB 12 can choose. As shown at block 408 of FIG. 4, the HeNB 12 selects from this reduced number one carrier frequency bandwidth for its own use, and at optional block 414 of FIG. 4 the one selected is the carrier frequency bandwidth whose interference is determined to be the least.

In an exemplary embodiment, the interference that is determined to make this final carrier selection at block 414 of FIG. 4 does not include those cells which were excluded at block 410 and/or 412 of FIG. 4, those with a high pathloss and of a predetermined type. Now assume that cell D as well as cell I were excluded at block 410 from the per carrier count due to high path loss. The final carrier selection will still be between $f_1$ for which the determined interference considers only cells A and H, and $f_3$ for which the determined interference considers only cells C and G. Interference from cells D and I are not included in measuring the interference for making the final carrier frequency bandwidth selection.

In one embodiment the interference for making the final decision at block 414 is lowest outgoing interference, from the HeNB 12 to its neighbors. In this outgoing interference embodiment the HeNB 12 will select $f_1$ at block 414 of FIG. 4 if it determines that interference by the host HeNB 12 to its neighbor cells is less if it selects $f_1$ over $f_3$. In an alternative embodiment, the interference for making the final decision at block 414 is lowest incoming interference, the least total interference seen by the host HeNB 12 from its non-excluded neighbors. By non-limiting example, the host HeNB 12 can measure incoming and outgoing interference for only particular cells using a background interference matrix as known in the art to make the selection at block 414.

If the above technique were restricted to counting and considering only CGS femto cells, then the count from FIG. 3 would be zero CSG femto cells for $f_3$ which would be the highest priority/least interference carrier; one CSG femto cell (cell D, which in this example is not excluded due to path loss) for $f_1$ since cell I is still excluded by the path loss threshold; and two CSG femto cells for $f_2$. In this case, still $f_2$ would be excluded from further consideration because it has the highest number of CGS femto cells per carrier, and the host HeNB would select $f_3$ since it still has the lowest interference among the reduced set of carriers $\{f_1, f_3\}$ after $f_2$ is removed from consideration (the final selection is different because in this example cell D is not excluded from the final interference measurements). Note that in this example the hybrid femto cells are excluded from the per carrier cell count; alternatively they may be included with the CSG femto cells and only the purebred non-CSG femto cells (and the macro cells) are excluded from the per carrier cell count.

While the example for FIGS. 2-3 result in the carrier $f_2$ having the least interference being the one which is excluded from selection by the host femto cell 12, this will not always be the case. For example, for the case where several non-excluded neighbor femto cells on a specific carrier are located furthest from the host cell but not excluded by the path loss threshold, that specific carrier might be the one excluded for having the highest number of neighbor femto nodes but it might also be the one with the least interference if no neighbor cells on that specific carrier are near enough to the host cell to drive up the interference level.

In an exemplary embodiment then, the algorithm performed by the host femto cell 12 may be summarized as follows:
1. Measure the received interference level on all the candidate carrier frequencies, and then sort the carriers according to the received interference (carriers not used by others have highest priority).
2. Measure the path loss towards the surrounding CSG femto nodes, and detect which carrier frequency they are using and what type of cell they are (CSG or non-CSG/hybrid).
3. Set a certain pathloss threshold to preclude far-away CSG femto cells (for example, find and only consider the closest CSG femto cells).
4. For the set of considered candidate carriers according to above, count the number of CSG femto nodes on each carrier frequency.
5. The carrier frequency with the highest (and second highest) number of CSG femto cells is afterwards excluded, and the carrier frequency in the remaining set of possible frequencies with the lowest measured interference level is selected.

One technical effect of the algorithm summarized immediately above is that it always aims at keeping a "clean" carrier frequency for the macro cell users, which is enabled by elements 3-5 above. Another technical effect is that it may be executed by the host femto cell autonomously of any other cell and the same functionality is distributed among all of the cells (assuming they are all operating the same or similar algorithm), since each host cell 12 can do its own interference measurements and path loss measurements. The combined autonomous and distributed feature means that no prior frequency planning is needed between macro cells and femto cells, and no central control point is needed to coordinate which cells can take which carrier(s) into use. The algorithm ensures that macro cell users will always have one carrier where they can be served without experiencing excessive femto cell interference, while at the same time allowing the carrier selection by the femto node to optimize femto node performance.

The interference may be measured in an embodiment using the so-called background interference matrix (BIM) at the host HeNB 12. The downlink BIM may be measured and the uplink BIM estimated from the downlink BIM, or the uplink BIM may be calculated separately (such as is detailed by example at co-owned U.S. provisional patent application No. 61/309,044, referenced in the background section above).

FIG. 4 is a logic flow diagram that illustrates the operation of a method, and a result of execution of computer program instructions, in accordance with exemplary embodiments of this invention from the perspective of a network element such as for example the HNB/HeNB/femto access node 12 or other base station. Those blocks of FIG. 4 with dashed outlines are noted above as being optional for specific exemplary embodiments. The various blocks shown in FIG. 4 may be viewed as method steps, and/or as actions that result from operation/execution of computer program code, and/or as a plurality of coupled logic circuit elements constructed to carry out the associated function(s).

Figure 5:
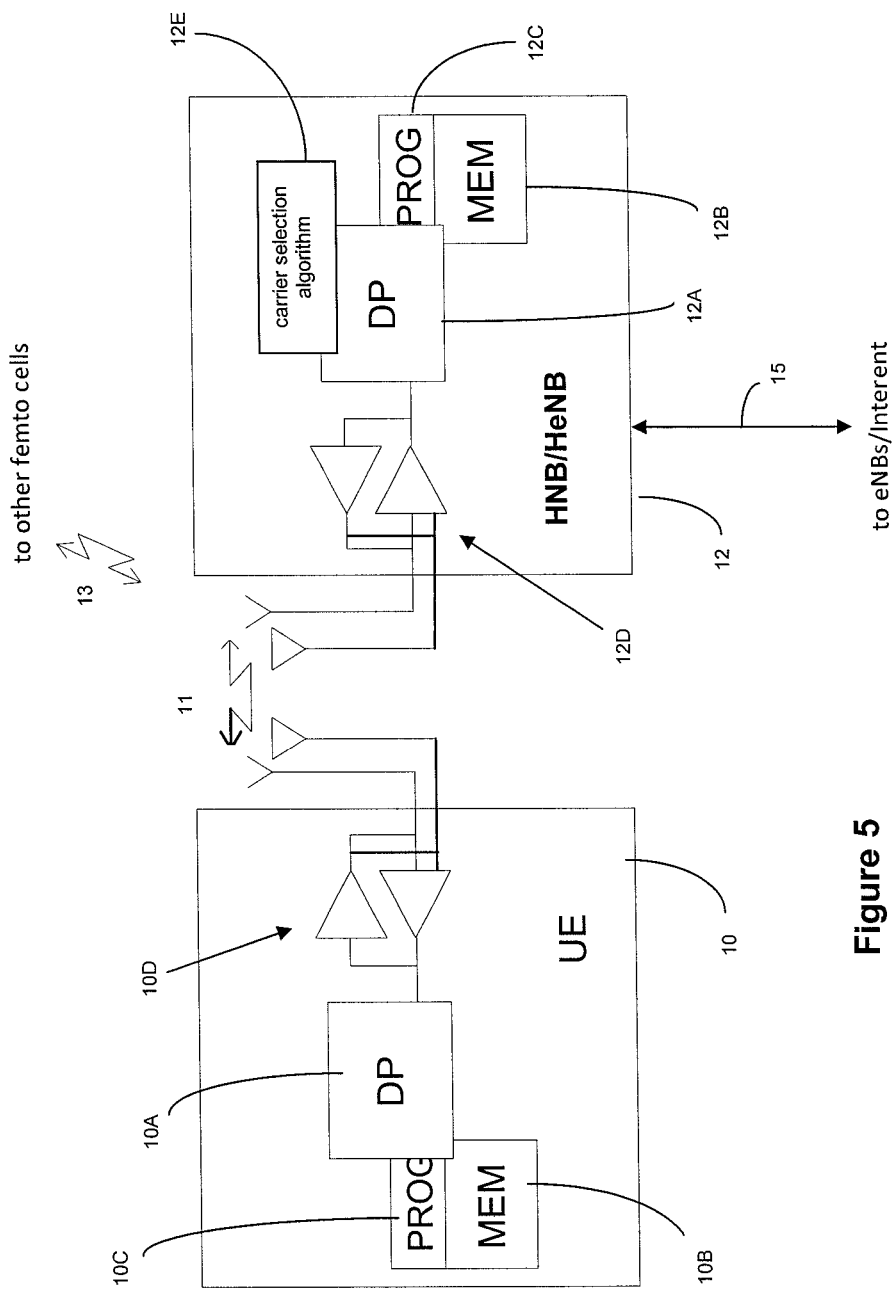
FIG. 5 shows a simplified block diagram of certain apparatus according to various exemplary embodiments of the invention.

Reference is now made to FIG. 5 for illustrating a simplified block diagram of various electronic devices and apparatus that are suitable for use in practicing the exemplary embodiments of this invention. In FIG. 5 a femto cell or access node, designated by example as a HNB/HeNB 12, is adapted for communication over a wireless link 11 with an apparatus, such as a mobile communication device referred to generally as a UE 10. The HNB/HeNB 12 is coupled via a data path 13 (typically wireless) to the other neighbor femto cells for measuring or otherwise determining interference and path loss. The HNB/HeNB 12 may be coupled via another data path 15 to macro cells such as for example eNBs and also directly to the Internet (by the same or a different path 15). The data path 15 may be wired or wireless.

The UE 10 represents those user devices served by the HNB/HeNB 12 and includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the HNB/HeNB 12 via one or more antennas. The HNB/HeNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 and others like it via one or more antennas.

At least the PROG 12C stored in the MEM 12B of the HNB/HeNB 12 is assumed to include program instructions that, when executed by the associated DP 12A, enable the device 12 to operate in accordance with the exemplary embodiments of this invention as are detailed above by example. That is, the exemplary embodiments of this invention may be implemented at least in part by computer software executable by the DP 12A of the NHB/HeNB 12, or by hardware, or by a combination of software and hardware (and firmware).

For the purposes of describing the exemplary embodiments of this invention the HNB/HeNB 12 may be assumed to also include a carrier selection algorithm 12E which selects a carrier from a given set of available carriers based at least on interference level and number of femto cells per carrier, as detailed more particularly above. In certain embodiments the functions of the carrier selection algorithm 12E may be performed by the DP 12A of the HNB/HeNB device 12, but are shown as a distinct functional block/circuitry in FIG. 5 to isolate the distinct function if not the distinct physical element performing that function.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMS 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments of the algorithm described by example above may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention are described above by way of schematic diagrams, table, flow chart and block diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all such modifications still fall within the scope of the non-limiting and exemplary embodiments of this invention.

For example, while the exemplary embodiments have been described above in the context of the LTE-Advanced and the WCDMA systems, it should be appreciated that the exemplary embodiments of this invention are not limited for use with only these particular types of wireless communication systems that uses carrier aggregation.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method of performing autonomous component carrier selection at a first femto cell, wherein the method comprises:
    determining at the first femto cell a received interference level for each nth component carrier of a designated set of N component carriers allotted to said first femto cell, wherein n is an index, N is an integer greater than one, and N is less than the total number of component carriers available in a carrier aggregation;
    for each nth component carrier, determining a number of neighboring femto cells operating on the nth component carrier;
    reducing the number of component carriers available for selection by said first femto cell to less than N by excluding from consideration for use by the first femto cell at least one component carrier based on the determined number of neighboring femto cells operating thereon, wherein reducing comprises excluding from consideration by the first femto cell a component carrier that is determined to have a highest number of neighboring femto cells operating thereon relative to the determined number of neighboring femto cells operating on each of remaining N component carriers;
    selecting from the reduced number a component carrier whose received interference level is determined to be least for use by the first femto cell; and
    reducing macro cell coverage holes by excluding, from consideration of the first femto cell autonomous component carrier selection, the component carrier with the highest number of neighboring femto cells operating thereon.

2. The method according to claim 1, wherein reducing the number of component carriers available for selection further comprises: excluding from the number of neighboring femto cells operating in at least one of the component carriers all neighboring femto cells whose path loss exceeds a threshold and which are of a predetermined type.

3. The method according to claim 2, wherein the predetermined type is a femto node operating for a closed subscriber group.

4. The method according to claim 1, wherein the determined number of neighboring femto cells operating on each of the nth component carriers is restricted to femto cells.

5. The method according to claim 1, wherein the method is executed by the first femto cell autonomously of any other cell, in which the first femto cell is one of a heterogeneous node B (HeNB) and a home node B (HNB).

6. The method according to claim 1, wherein reducing the number of component carriers available for selection comprises excluding from the number of neighboring femto cells operating in at least one of the component carriers all neighboring femto cells whose path loss exceeds a threshold and which are of a predetermined type; and further wherein the received interference level that is determined to be the least does not include received interference levels from the excluded neighboring femto cells.

7. A memory storing computer readable instructions that when executed by at least one processor cause the at least one processor to perform autonomous component carrier selection actions comprising:
    determining by a first femto cell a received interference level for each nth component carrier of a designated set of N component carriers allotted to said first femto cell, wherein n is an index, N is an integer greater than one, and N is less than the total number of component carriers available in a carrier aggregation;
    for each nth component carrier, determining a number of neighboring femto cells operating on the nth component carrier;
    reducing the number of component carriers available for selection by said first femto cell to less than N by excluding from consideration for use by the first femto cell at least one component carrier based on the determined number of neighboring femto cells operating thereon, wherein reducing comprises excluding from consideration by the first femto cell a component carrier that is determined to have a highest number of neighboring femto cells operating thereon relative to the determined number of neighboring femto cells operating on each of remaining N component carriers;

selecting from the reduced number a component carrier whose received interference level is determined to be least for use by the first femto cell; and reducing macro cell coverage holes by excluding, from consideration of the first femto cell autonomous component carrier selection, the component carrier with the highest number of neighboring femto cells operating thereon.

8. The memory according to claim 7, wherein reducing the number of component carriers available for selection further comprises: excluding from the number of neighboring femto cells operating in at least one of the component carriers all neighboring femto cells whose path loss exceeds a threshold and which are of a predetermined type.

9. An apparatus for performing autonomous component carrier selection at a first femto cell, wherein the apparatus compises:

at least one processor; and at least one memory storing computer program code;

in which the at least one processor is configured with the at least one memory and computer program code to cause the apparatus to perform at least:

determining at said first femto cell a received interference level for each nth component carrier of a designated set of N component carriers allotted to said first femto cell, wherein n is an index, N is an integer greater than one, and N is less than the total number of component carriers available in a carrier aggregation;

for each nth component carrier, determining a number of neighboring femto cells operating on the nth component carrier;

reducing the number of component carriers available for selection by said first femto cell to less than N by excluding from consideration for use by the first femto cell at least one component carrier based on the determined number of neighboring femto cells operating thereon, wherein reducing comprises excluding from consideration by the first femto cell a component carrier that is determined to have a highest number of neighboring femto cells operating thereon relative to the determined number of neighboring femto cells operating on each of remaining N component carriers;

selecting from the reduced number a component carrier whose received interference level is determined to be least for use by the first femto cell; and reducing macro cell coverage holes by excluding, from consideration of the first femto cell autonomous component carrier selection, the component carrier with the highest number of neighboring femto cells operating thereon.

10. The apparatus according to claim 9, wherein reducing the number of component carriers available for selection further comprises: excluding from the number of neighboring femto cells operating in at least one of the component carriers all neighboring femto cells whose path loss exceeds a threshold and which are of a predetermined type.

11. The apparatus according to claim 10, wherein the predetermined type is a femto node operating for a closed subscriber group.

12. The apparatus according to claim 9, wherein the determined number of neighboring femto cells operating on each of the nth component carriers is restricted to femto cells.

13. The apparatus according to claim 9, wherein the apparatus comprises the first femto cell which is one of a heterogeneous node B (HeNB) and a home node B (HNB).

14. The apparatus according to claim 9, wherein reducing the number of component carriers available for selection comprises excluding from the number of neighboring femto cells operating in at least one of the component carriers all neighboring femto cells whose path loss exceeds a threshold and which are of a predetermined type; and further wherein the received interference level that is determined to be the least does not include interference from the excluded neighboring femto cells.

* * * * *